June 10, 1952 J. A. PIERCE 2,599,777
GAIN CONTROL DEVICE FOR RADIO RECEIVERS
Filed May 14, 1945
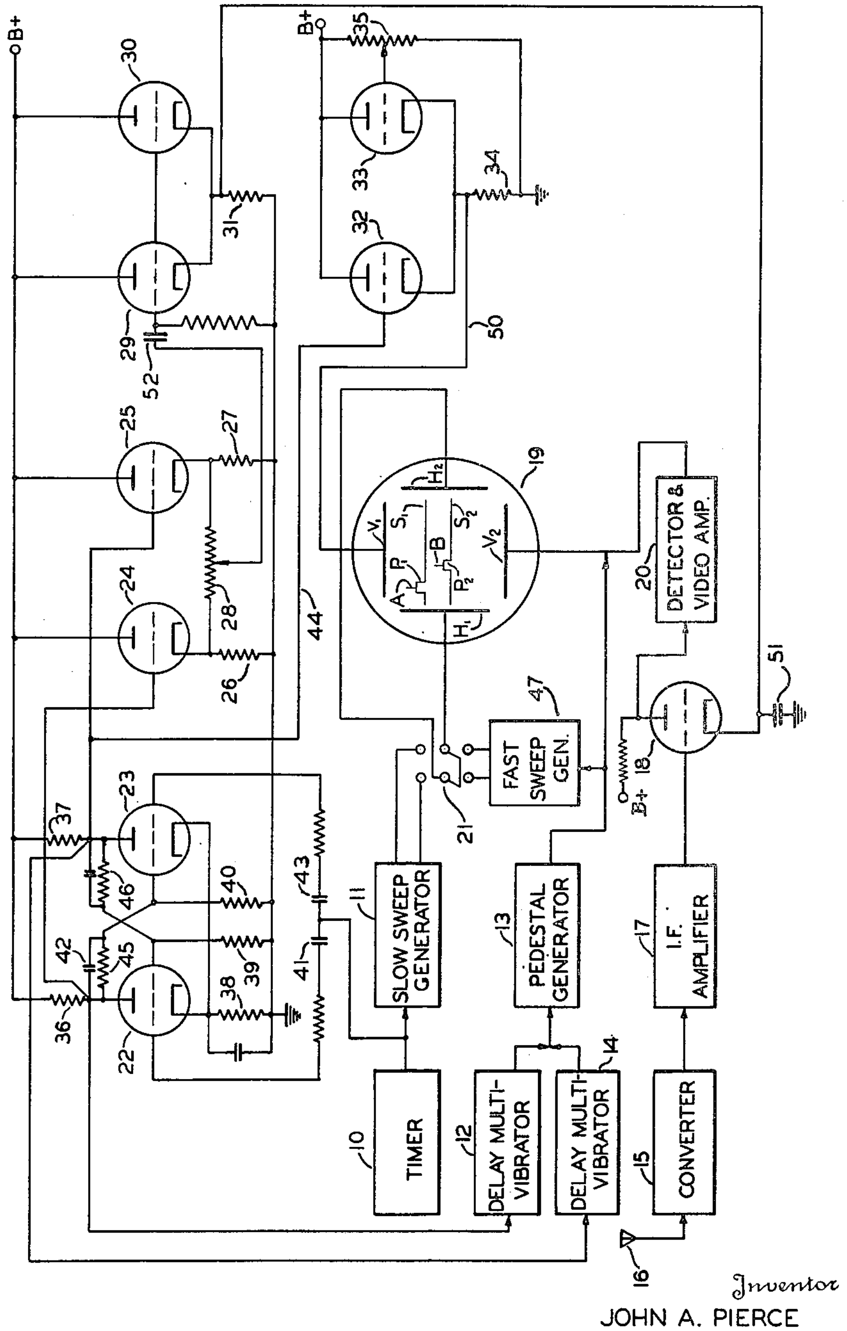
Inventor
JOHN A. PIERCE
By Ralph L. Chappell
Attorney Patented June 10, 1952 2,599,777

UNITED STATES PATENT OFFICE 2,599,777

GAIN CONTROL DEVICE FOR RADIO RECEIVERS

John A. Pierce, Cambridge, Mass., assignor, by mesne assignments, to the United States of America as represented by the Secretary of the Navy Application May 14, 1945, Serial No. 593,607

11 Claims. (Cl. 250—20)

This invention relates to a gain control device for radio receivers and particularly to one for equalizing the amplitudes of a pair of similar and identically recurrent pulses received from a pair of distinctively remote points of transmission.

It is an object of this invention to provide a means for equalizing the detected amplitudes of a pair of similarly recurrent pulse signals which have distinct and varying distances of propagation.

It is another object of this invention to provide a means for producing a rectangular voltage wave of controllable amplitude and reversible phase.

Other objects and features of the present invention will become apparent upon a careful consideration of the following detailed description when taken together with the accompanying drawings, the single figure of which is a schematic diagram of a preferred embodiment of the invention.

The invention is hereinafter described as embodied in the apparatus shown in the patent application of A. L. Loomis filed July 3, 1945, Serial No. 603,090 and entitled "Long Range Navigation System" and the patent application of Jabez C. Street, John A. Pierce and Donald E. Kerr entitled "Long Range Navigation System" filed June 13, 1945, Serial No. 599,163. In this system of navigation the position of a receiver is determined by observing at the receiver the time difference in arrival of two or more pairs of identically recurrent energy pulses emitted at different instants from distinctively remote points of transmission. In the preferred embodiment, this system is arranged so that a pulse is first emitted by one station, or point, of each pair and followed thereafter in time by the emission of a similar pulse from the other station of the pair. The time interval elapsing between the respective pulse emissions has been set at some predetermined value, greater than the time required for a pulse to propagate between the stations, and one-half the time interval elapsing between successive pulse emissions from either of the stations, when added together. With this time relationship, the first pulse signal to be detected at the receiver will be the first to be emitted, regardless of the position of the receiver relative to the two stations.

The pulse signal first to be transmitted is picked up by an antenna 16 and fed through a frequency converter 15, a suitable number of intermediate frequency amplifier stages 17, and a gain control tube 18 whose operation will later be described. From the gain control tube the signal is passed through a detector and video amplifier 20 to a vertical deflecting plate $V_2$ of the cathode ray tube 19 where it is caused to appear on a first horizontal sweep line. The other signal is passed through the same channels and caused to appear on a second horizontal sweep line which is parallel to the first sweep line as disclosed in aforesaid applications. These sweep lines are produced by the slow sweep generator 11 in response to a regularly recurrent series of positive keying pulses which are obtained from the timer 10 and are applied through the double pole, double throw switch 21, when the latter is in an up position, to the horizontal deflecting plates $H_1$ and $H_2$ of the cathode ray tube 19. The slow sweep generator is simply a known type of saw-tooth voltage generator such as, for example, a normally non-conducting triode vacuum tube which has a charging condenser connected between its plate and cathode so that when the positive keying pulses from the timer 10 are applied to its grid the tube is rendered conducting and the charging condenser makes a rapid discharge through the tube. Thereafter the tube is reestablished non-conducting by its bias and the charging condenser starts a gradual charge through the plate load resistor of the tube. The timer 10 may consist, for example, of an electrical counter chain driven by a stable oscillator such as a crystal controlled oscillator and adjusted so that the output pulses from the final counter stage which form the keying pulses for the slow sweep generator 10, recur at a frequency equal to twice the recurrence frequency of the received pulse signals. The polarity of the output terminals of the slow sweep generator are arranged so that the cathode ray tube beam sweeps slowly from left to right with the charging of the condenser in the saw-tooth voltage generator and at such a rate that when the beam of the tube just reaches the right-hand edge of the tube the slow sweep generator is keyed by the timer and another sweep is started. Thus since the output from the timer which is in the form of positive pulses is set at twice the recurrence frequency of the received pulse signal, the time duration of each sweep must correspond to one-half the interval elapsing between successive pulse emissions from either station of the pair.

Unless some means is provided for alternately changing the bias on the vertical deflecting plates of the cathode ray tube from one value during the production of one sweep to another value during the production of the next sweep, all of the sweeps will be superimposed and there will be no way of distinguishing the first sweep line from the second. Such a means is shown in the figure consisting of an Eccles-Jordan type of multivibrator which is driven from the same output of the timer 10 that keys the slow sweep generator 11 and comprises tubes 22 and 23. The output of the multivibrator as taken from the plate circuit of tube 23 is fed through lead 44 and the trace shift circuit which comprises tubes 32 and 33, to the vertical deflecting plate $V_1$ of the cathode ray tube 19. The plate load resistors 36 and 37 of tubes 22 and 23 are made equal as are the grid return resistors 39 and 40, and the plate grid resistors 45 and 46. Resistors 39 and 46 are so proportioned, that if, tube 23 is conducting the grid of tube 22 is held sufficiently below the potential of the cathodes of tubes 22 and 23 so that tube 22 will be biased non-conducting by means of its increased cathode voltage and decreased grid voltage, both of which are the result of the current of tube 23 which flows through the plate load resistance 37 of tube 23 and also through the resistance 38 which is common to the cathodes of both tubes. When a positive keying pulse from the timer 10 sets the generator 11 into operation to start the first sweep, a part of the same keying pulse passes through condenser 41 to the grid of tube 22 to render this tube conducting. This pulse appears as a negative pulse on the plate of tube 22 and is passed through condenser 42 to the grid of tube 23 to cut off the latter and thereby raise its plate voltage. Conditions are now reversed, tube 22 is held conducting and tube 23 is held non-conducting in a manner similar to that explained above and will remain so until the occurrence of the next keying pulse from the timer 10. Thus it is seen that the plate of tube 23 swings alternately first positive and then negative while the plate of tube 22 undergoes a similar voltage alternation but of an opposite phase. Now then, since the output frequency of the timer 10 is adjusted to equal twice the recurrence rate of the received pulse signal, the time duration of the half cycles of voltage alternation from the plate of tubes 22 and 23 must equal the time duration of the cathode ray tube sweeps and be synchronized therewith.

As the timer 10 keys the slow sweep generator 11 to produce the first horizontal sweep line, the plate of tube 23 swings positive. This positive voltage is applied to the grid of tube 32 and appears across its cathode resistance 34 and is in turn applied through lead 50 to the vertical deflecting plate $V_1$ of the cathode ray tube 19, to thereby cause the first sweep $S_1$ to appear in one horizontal plane. Also connected to the resistance 34 is the cathode of a second triode tube 33. The grid of this tube is connected to the movable arm of the potentiometer 35 the resistance of which is connected between B+ and ground.

A voltage rise across resistance 34 produced by an increase in current through tube 32 will reduce the effective grid to cathode voltage of tube 33. This will reduce the current through this tube 33 with a resulting reduction in the current component of this tube through resistor 34. Hence tube 33 and its associated circuit is effective to offset the voltage change across resistor 34 due to tube 32, and the potentiometer setting will determine how much this voltage will offset. Thus it is seen that the first and second sweep lines occur in upper and lower horizontal planes respectively, and that the amount of separation between these sweeps can be varied, by potentiometer 35, from a maximum, when a minimum of current passes through tube 33, to zero, or in other words where they are superimposed, when all of the voltage developed across resistance 34 is furnished by the current of tube 33.

Disposed on each of the time sweeps is a pedestal, $P_1$ and $P_2$ respectively, which are produced in the following manner. As the first sweep is initiated the plate of tube 23 swings positive. This positive rise is differentiated by means not shown and applied as a keying pulse to the delay multivibrator 14. This multivibrator is of a known type and operates to produce a voltage pulse of a fixed time duration the trailing edge of which keys the pedestal generator 13 into operation. Pedestal generator 13 is also a known type of multivibrator which produces a negative voltage pulse of a fixed time duration and amplitude which is applied to the lower vertical plate $V_2$ of the cathode ray tube 19. At the start of the second or lower time sweep $S_2$ the plate voltage of tube 22 swings positive. This positive rise in plate voltage is also differentiated by means not shown and applied as a keying pulse to the delay multivibrator 12. This multivibrator is substantially of the same construction as multivibrator 14 except that it generates an adjustable time voltage pulse, the trailing edge of which keys into operation the pedestal generator 13 to produce a pedestal on the second time sweep $S_2$. The time duration of the delaying pulse generated by the multivibrator 12 may be placed under control of a potentiometer which is inserted in the circuit in a known manner and graduated in time so as to have a zero setting when the pedestal $P_2$ produced as the second sweep $S_2$ occurs at a point which exactly corresponds to the point occupied by the pedestal $P_1$ on the first sweep $S_1$. The phase of the sweep is then altered by changing the frequency of the output from the timer 10 until the first pulse indication A appearing on the first or top sweep $S_1$ drifts over and lies on the first pedestal $P_1$ near the leading edge thereof. Thereafter the time duration of the pulse from multivibrator 12 is adjusted, until the second pedestal $P_2$ is positioned so that the second pulse indication B lies at a point on the second pedestal $P_2$ which corresponds to the point the first pulse A occupies on the first pedestal P. A measure of the time difference in arrival of the respective pulse signals may then be observed from the setting of the delay multivibrator 12. This setting of the potentiometer will be a measure of the time difference between the leading edges of the respective pedestals so that in order to obtain a true measure of the time difference in pulse arrival the latter must occupy exactly corresponding points on the respective pedestals. For this purpose the output of the pedestal generator 13 keys a fast sweep generator 47 which may be nothing more than a saw-tooth voltage generator similar to the slow sweep generator 11, except in this case the saw-tooth voltage tube is normally held conducting and rendered blocked by the negative pedestal pulse so that the gradual charging of the condenser takes place over the time duration of the pedestal. Thus, when the double throw double pole switch 21 is set in the down position, then the tops of the respective pedestals will appear as the upper and lower sweeps. Then by reducing the separation between the sweeps to zero by adjustment of potentiometer 35 and adjusting the phase of the second pedestal by adjustment of the potentiometer the respective pulse indication can be superimposed to indicate positional correspondence of the pulse indications on their respective pedestal.

Exact positioning of the pulse signal at corresponding points can only be attained when their indications appear identical and superimposed on the face of the cathode ray tube. To make the pulse indications appear identical requires only that their amplitudes be equalized since their time durations will be set equal by the respective stations that transmit them. Amplitude equalization is one of the objects of the invention, and the circuit used for accomplishing this object is shown in the figure, consisting in part of a pair of cathode follower tubes 24 and 25, each of which has a cathode resistance 26 and 27 and a potentiometer 28, the resistance of which is interposed between the cathodes of the cathode follower tubes. A push-pull input obtained from the plates of tubes 22 and 23 constituting the Eccles-Jordan multivibrator is then applied to their grids, causing their respective cathodes to rise and fall alternately and in phase opposition. Thus if the output of the multivibrator is suitably balanced, the cathode voltage of one tube will rise at one instant, while the cathode of the other will fall an equal amount during the same instant. Hence, the mid-point of the potentiometer 28 will remain at a constant potential while points to the right and left thereof will rise and fall in phase opposition by amounts, which depend on how far disposed the potentiometer arm is from the mid-point of the potentiometer resistance. For example, a point to the right of the mid-point of potentiometer 28 will rise during the production of the first or top sweep $S_1$ and fall during the production of the second sweep or bottom sweep $S_2$. Simultaneously a point to the left will undergo a phase opposed voltage alteration. Therefore, the square wave output from the push-pull cathode follower circuit as obtained from the movable arm of the potentiometer 28 can be regulated from zero to full amplitude in either phase of push-pull input. The alternating current component of this output is then applied through blocking condenser 52 in parallel to the grids of a pair of cathode followers 29 and 30 which have a common cathode resistance 31 which also serves as the cathode bias resistance for the final I. F. amplifier 18 or gain control tube. In this way the gain of the amplifier 18 may be increased and decreased alternately in response to the negative and positive half cycles of the square wave output obtained from potentiometer 28. Thus, by proper manipulation of the potentiometer 28, the bias on I. F. amplifier 18 can be alternately varied in the proper sense so as to increase the gain of the receiver during the production of the first sweep or reception of the first pulse and reduce the gain of the receiver during the production of the second sweep or reception of the second pulse or vice versa. The radio frequency components of the current in the I. F. amplifier 18 may be substantially by-passed to ground through condenser 51.

The advantage of using a pair of cathode follower control tubes 29 and 30 placed in parallel rather than a single control tube is that in the operation of the circuits to be controlled, tube 18, will react less upon the control circuit. In other words, the maximum effect that a current flowing through tube 18 can exert on the operation of the control tubes 29 and 30 is one-half that which would occur if a single control tube were used.

In a preferred embodiment of this invention the relative direct current potentials of the cathodes of tubes 18, 29, and 30, and of the grid return of tube 18, may be so adjusted that the gain of the receiver may be decreased during the positive half cycles of the square wave obtained from potentiometer 28, while the gain during the negative half cycles does not vary with the setting of potentiometer 28. This result follows from adjusting the grid return voltages of tubes 29, 30 and 18 so that when potentiometer 28 is set in its center position the current in resistor 31 is only that through tube 18, and tubes 29 and 30 are cut off. In this condition any negative half cycles of the square wave voltage, of whatever amplitude, will have no effect upon the current in resistor 31 and hence upon the gain of the receiver. The advantage of this method of operation is that the main gain control of the receiver may be adjusted to make the weaker of the two pulses being examined appear with the desired amplitude and that thereafter the amplitude balance control may be operated to produce output pulses of equal amplitude without so changing the amplitude of the weaker pulse that readjustment of the main gain control becomes necessary.

Although I have shown and described only a certain and specific embodiment of the invention I am fully aware of the many modifications possible thereof. Therefore this invention is not to be limited except insofar as is necessitated by the prior art and spirit of the appended claims.

I claim:

1. In a radio receiver system which is adapted to detect a pair of similarly recurrent pulse signals having distinctively remote points of transmission and different times of arrival at the receiver, a means for equalizing the amplitude of said detected pulse signals, comprising a means for producing a rectangular voltage wave having a frequency equal to the recurrence frequency of said detected signals, means for adjusting the amplitude of said rectangular voltage wave, means for controlling the phase of said rectangular voltage wave so that the positive half cycles thereof occur during the reception of the stronger pulse signal of said pair and the negative half cycles thereof occur during the reception of the weaker pulse signal of said pair, and means responsive to said positive and negative half cycles of said rectangular voltage wave for respectively decreasing and increasing the gain of said receiver by amounts dependent upon the amplitude of said rectangular voltage wave.

2. In a radio receiver system of the superheterodyne type which has an intermediate frequency amplifier stage and which is adapted to detect a pair of similarly recurrent pulse signals having different amplitudes and different times of arrival at the receiver, a means for equalizing the amplitudes of said detected pulse signals, comprising a means for producing a rectangular voltage wave having a frequency equal to the recurrence frequency of said pulse signals, means for controlling the phase of said rectangular voltage wave so that the positive half cycles thereof occur during the reception of the stronger pulse signal of said pair and the negative half cycles thereof occur during the reception of the weaker pulse signal of said pair, means for varying the amplitude of said rectangular voltage wave in proportion to the difference in amplitude between said stronger and weaker pulses, and means responsive to said positive and negative half cycles of said rectangular voltage wave for increasing and decreasing, respectively the bias of said intermediate frequency amplifier.

3. In a radio receiver system which is adapted to detect a pair of similarly recurrent pulse signals having different points of transmission and different times of arrival at the receiver, a means for reducing the amplitude of the stronger of said detected pulse signals, comprising a means for producing a controllable amplitude reversible phase rectangular voltage wave having a frequency equal to the recurrence frequency of the receiver pulse signals, means phasing the production of said rectangular voltage wave so that the positive half cycles thereof occur during the reception of one pulse of said pair and the negative half cycles thereof occur during the reception of the other pulse of said pair, and means responsive to said negative and positive half cycles of said rectangular voltage wave for increasing and decreasing, respectively, the gain of said receiver.

4. In a radio receiver system of the superheterodyne type which has an intermediate frequency amplifier stage and which is adapted to detect a pair of similarly recurrent pulse signals having different times of arrival at the receiver, a means for equalizing the amplitude of said detected pulse signals, comprising a means for producing a rectangular voltage wave having a frequency equal to the recurrence frequency of said pulse signals, means for controlling the phase of said rectangular voltage wave so that the positive half cycles thereof occur during the reception of the stronger pulse signal of said pair and the negative half cycles thereof occur during the reception of the weaker pulse signal of said pair, and means responsive to said positive and negative half cycles of said rectangular voltage wave for increasing and decreasing, respectively the bias of said intermediate frequency amplifier, said last named means comprising a pair of cathode follower triode tubes which have a common cathode resistance and across which the bias voltage for said intermediate frequency amplifier is obtained, and means for connecting said phase controlling means to the grids of said cathode followers in parallel.

5. In a receiver adapted to receive similar recurrent pairs of pulse signals, a first pulse of said pairs arriving at said receiver during first spaced preselected intervals of time and the second pulse of said pairs arriving at said receiver during second intervals of time equal in duration and intermediate successive ones of said first preselected intervals, means generating a rectangular voltage wave having positive and negative half cycles equal in duration to said first and second preselected intervals, means connected to said generating means for controlling the phase and amplitude of said rectangular voltage wave, and means responsive to the output of said last-mentioned means for varying the gain of said receiver.

6. In a receiver adapted to detect similar recurrent pairs of pulse signals, a first pulse of said pairs arriving at said receiver during first spaced preselected intervals of time and the second pulse of said pairs being of different amplitude than said first pulse and arriving at said receiver during second intervals of time equal in duration and intermediate successive ones of said first preselected intervals, means for equalizing the amplitude of said first and second detected pulse signals comprising, means generating a rectangular voltage wave having positive and negative half-cycles equal in duration to said preselected intervals, means connected to said generating means for controlling the phase of said rectangular voltage wave so that the positive cycle thereof occurs during said first preselected interval and the negative cycle thereof occurs during said second preselected interval, means for adjusting the amplitude of said rectangular voltage, and means responsive to said positive and negative half-cycles of said rectangular waves for decreasing and increasing, respectively, the gain of said receiver.

7. In a receiver adapted to detect similar recurrent pairs of pulse signals, a first pulse of said pair arriving at said receiver during first preselected intervals of time and the second pulse of said pairs being of different amplitude than said first pulse and arriving at said receiver during second intervals of time equal in duration and intermediate successive ones of said first preselected intervals, means for equalizing the amplitude of said detected pulse signals comprising, means for generating a rectangular voltage wave having positive and negative half cycles equal in duration to said preselected intervals, means for controlling the amplitude of said rectangular voltage waves, means for controlling the phase of said rectangular voltage wave so that the positive half cycles thereof occur during the reception of the stronger pulse signal of said pair, and means responsive to said positive and negative half cycles of said rectangular voltage wave for decreasing and increasing, respectively, the gain of said receiver.

8. In a receiver adapted to detect similar recurrent pairs of pulse signals, a first pulse of said pairs arriving at said receiver having first preselected intervals of time and the second pulse of said pairs arriving at said receiver during second intervals of time equal in duration and intermediate successive ones of said first preselected intervals, means for equalizing the amplitude of said detected pulse signals comprising, means generating a rectangular voltage wave having positive and negative half cycles equal in duration to said preselected intervals, first and second electron tubes each having at least an anode, a cathode and a control grid and each being connected as a cathode follower, means applying said rectangular voltage wave in opposite phase to the control grids of said first and second tubes, a potentiometer having a movable arm connecting the cathodes of said first and second tubes for controlling the amplitude of said rectangular voltage wave and reversing the phase thereof so that the positive half cycles thereof occur during the reception of the stronger pulse signal of said pair and the negative half cycles thereof occur during the reception of the weaker pulse signal of said pair, and means connected to said movable arm and responsive to said positive and negative half cycles for decreasing and increasing, respectively, the gain of said receiver.

9. In a receiver adapted to detect similar recurrent pairs of pulse signals, a first pulse of said pairs arriving at said receiver during first preselected intervals of time and the second pulse of said pairs arriving at said receiver during second intervals of time equal in duration and intermediate successive ones of said first preselected intervals, means for equalizing the amplitude of said detected pulse signals comprising, means generating a rectangular voltage wave having positive and negative half cycles equal in duration to said preselected intervals, a pair of cathode follower triode tubes having a potentiometer connected between their cathodes, means applying said rectangular voltage waves to said cathode followers in phase opposition, whereby movement of the movable arm of said potentiometer from one end of the resistance of the potentiometer to the other produces a voltage between the movable arm and a reference point which varies from maximum amplitude of one phase, through zero to maximum amplitude of the other phase, and means connected to said movable arm and responsive to said positive and negative half cycles for decreasing and increasing, respectively, in proportion to the amplitude of said rectangular voltage wave, the gain of said receiver.

10. A gain control circuit for a receiver comprising, in combination, means for generating a rectangular voltage wave having positive and negative half cycles of equal duration, first and second electron tubes each having at least an anode, a cathode, and a control grid, and each being connected as a cathode follower, means for applying said rectangular voltage wave to the control grids of said first and second tubes in phase opposition, a potentiometer connected between the cathodes of said first and second tubes, and means connected to the movable arm of said potentiometer and responsive to said positive and negative half cycles for decreasing and increasing, respectively, the gain of said receiver.

11. A gain control circuit for a receiver comprising, in combination, means for generating a rectangular voltage wave having positive and negative half cycles of equal duration, first and second electron tubes each having at least an anode, a cathode, and a control grid, and each being connected as a cathode follower, a potentiometer connected between the cathodes of said first and second tubes, means for applying said rectangular voltage wave to the control grids of said tubes in phase opposition whereby movement of the contact of said potentiometer from one end of the resistance of the potentiometer to the other produces a voltage between the movable contact and a reference point which varies from maximum amplitude of one phase through zero to maximum amplitude of the other phase, and means connected to said movable arm and responsive to said positive and negative half cycles for decreasing and increasing, respectively, in proportion to the amplitude of said rectangular voltage wave, the gain of said receiver.

JOHN A. PIERCE.

REFERENCES CITED

The following references are of record in the file of this patent:

UNITED STATES PATENTS

| Number | Name | Date |
|---|---|---|
| 1,992,019 | Taylor | Feb. 19, 1935 |
| 2,284,102 | Rosencrans | May 26, 1942 |
| 2,384,263 | Schlesinger | Sept. 4, 1945 |
| 2,422,334 | Bedford | June 17, 1947 |
| 2,430,570 | Hulst, Jr. | Nov. 11, 1947 |

FOREIGN PATENTS

| Number | Country | Date |
|---|---|---|
| 460,488 | Great Britain | Jan. 28, 1937 |